United States Patent [19]
Pizzi

[11] Patent Number: 5,738,490
[45] Date of Patent: Apr. 14, 1998

[54] GAS TURBINE ENGINE SHROUD SEALS

[75] Inventor: Antonio Pizzi, Nun's Island, Canada

[73] Assignee: Pratt & Whitney Canada, Inc., Longueuil, Canada

[21] Appl. No.: 650,441

[22] Filed: May 20, 1996

[51] Int. Cl.$^6$ ............................... F01D 9/04; F01D 11/08
[52] U.S. Cl. .................. 415/139; 415/170.1; 415/173.1; 415/173.3; 415/173.5; 415/174.2; 415/174.5; 415/180; 415/209.2; 277/167.5; 277/219; 277/236
[58] Field of Search ........................ 415/135, 138, 415/139, 170.1, 173.1, 173.3, 173.4, 173.5, 173.6, 174.2, 174.5, 204.2, 204.3, 115, 116, 180; 277/167.5, 218, 219, 236

[56] References Cited

U.S. PATENT DOCUMENTS

| | | |
|---|---|---|
| 3,712,757 | 1/1973 | Goodwin . |
| 3,754,766 | 8/1973 | Asplund ........................ 415/174.2 |
| 3,869,222 | 3/1975 | Rahnke et al. . |
| 4,311,432 | 1/1982 | Kildea ............................ 415/139 |
| 4,422,827 | 12/1983 | Buxe et al. . |
| 4,524,980 | 6/1985 | Lillibridge et al. ............... 415/115 |
| 4,551,064 | 11/1985 | Pask ................................ 415/115 |
| 4,573,866 | 3/1986 | Sandy, Jr. et al. . |
| 4,743,164 | 5/1988 | Kalogeros . |
| 5,145,316 | 9/1992 | Birch ............................... 415/173.1 |
| 5,158,430 | 10/1992 | Dixon et al. . |
| 5,176,495 | 1/1993 | Honkomp et al. . |
| 5,188,507 | 2/1993 | Sweeney . |
| 5,192,185 | 3/1993 | Leonard . |
| 5,197,853 | 3/1993 | Creevy et al. ..................... 415/115 |
| 5,201,846 | 4/1993 | Sweeney . |
| 5,273,396 | 12/1993 | Albrecht et al. .................. 415/173.1 |
| 5,281,097 | 1/1994 | Wilson et al. . |
| 5,333,995 | 8/1994 | Jacobs et al. . |
| 5,460,489 | 10/1995 | Benjamin et al. . |
| 5,513,955 | 5/1996 | Barcza . |

*Primary Examiner*—Christopher Verdier
*Attorney, Agent, or Firm*—Jeffrey W. Astle

[57] ABSTRACT

A seal assembly for a turbine blade tip shroud including a one-piece bent metallic sheet inter-segment seal having an axial component and a vertical component adapted to fit in a groove formed in the end walls of each shroud segment, wherein the shroud segment has a platform and radially extending ribs, and the seal fits tightly in the groove providing an axial and a radial component to the seal. A ring seal is also provided for sealing a joint between the shroud and a mounting structure where an annular gap is formed having an "L" shaped cross-section, the ring seal having a "C" shaped configuration and one of the legs of the "C" extending within an axial component of the "L" shaped gap. The leg has a wave pattern with the peaks of the wave in contact with opposite radial walls of the axial component of the gap for creating a gas seal at the joint.

4 Claims, 3 Drawing Sheets

5,738,490

GAS TURBINE ENGINE SHROUD SEALS

BACKGROUND OF THE INVENTION

1. Field of the Invention

The present invention relates to gas turbine engines, and more particularly, to turbine blade shroud seals for reducing the leakage of cooling fluid in the casing surrounding the turbine blades.

2. Description of the Prior Art

There have been many attempts to improve the sealing capabilities of annular shrouds surrounding the tips of turbine blades. The engine casing surrounds the turbine section of an aircraft engine and is constructed to conduct cooling gases within the casing to various elements, such as the shrouds themselves. The turbine section of the engine, which is concentric to the casing, is in the path of very hot gases. It is preferred that the surrounding casing structure be maintained relatively cool.

The annular shroud for the turbine blade tips is normally segmented in the circumferential direction. Seals are required to prevent gas leakage at the gaps formed between the ends of the shroud segments. U.S. Pat. Nos. 4,767,260 to Clevenger et al. issued Aug. 30, 1988, and 5,158,430, to Dixon et al. issued Oct. 27, 1992, show variations on feather seals placed between the platforms of the vane assemblies. U.S. Pat. No. 4,573,866, to Sandy, Jr. et al. issued Mar. 4, 1986, shows a feather seal in a radial plane between the ends of the blade tip shrouds. U.S. Pat. No. 5,318,402, to Bailey et al. issued Jun. 7, 1994, shows a spline or feather seal and a circumferential spacer band that locks the shrouds and the feather seals together.

Different sealing rings are also required for different shroud and casing configurations. For instance, in a configuration involving a split joint with a groove having an axial component, it is conventional to use a "C" shaped ring. In U.S. Pat. No. 4,573,866, a bellows type ring is utilized in such a groove. Although such ring seals provide excellent sealing qualities, they tend to be stiff in compression due to the radial cross-section thereof and are, therefore, not easily replaced during engine maintenance. In fact, special tools may be required to replace such a seal.

SUMMARY OF THE INVENTION

It is an aim of the present invention to provide an improved inter-shroud segment seal of the type having an axial component and a radial component.

It is a further aim of the present invention to provide a simple one-piece sheet seal for sealing the gap formed between the ends of circumferential shroud segments in order to reduce leakage of the cooling gases into the hot gas path.

It is a further aim of the present invention to provide a ring seal for sealing annular joints formed with an annular gap having an axial component.

It is a further aim of the present invention to have a ring seal formed of sheet metal that is readily compressible in the radial direction for easier installation.

It is a further aim of the present invention to provide an improved sealing arrangement for a turbine blade tip shroud assembly.

A construction in accordance with the present invention includes a seal for a turbine blade tip shroud for a gas turbine engine where the shroud is located between the axially directed hot gas path and a concentric cooling gas conduit formed between the shroud and an outer casing and wherein the shroud includes a plurality of segments arranged circumferentially with each shroud segment having an axial platform and at least one radial rib extending from the platform, the shroud segments having end walls and a groove defined in the end wall portion corresponding to the platform and continuously in the end wall portion corresponding to the rib, the seal comprising a one-piece sheet member formed to the configuration of the continuous groove in the end wall portions such that a portion of the seal has an axial component and a portion of the same seal has a radial component.

In a more specific embodiment of the present invention, the vertical component of the sheet forming the seal is doubled over so that the vertical component is a resilient member providing a frictional engagement within the groove formed in the wall of the radial rib.

In another aspect of the present invention, a ring seal is provided for a gas turbine engine for sealing a joint between two annular engine parts when an annular gap is formed with an axial component, the axial gap having spaced-apart radial walls, wherein the ring seal has an axial portion including a wavy portion with one peak of the wavy portion in contact with one of the spaced-apart walls and another peak in contact with the other spaced-apart wall of the gap whereby the gap is sealed against leakage by gases flowing on either side of the joint and the wavy portion subtends an angle sufficient to allow the seal to be readily compressed radially.

In a more specific embodiment of the present invention, there is provided a ring seal for a turbine blade tip shroud for a gas turbine engine, where the shroud is located between the axially directed hot gas path and a concentric cooling gas conduit formed between the shroud and an outer casing and the shroud includes a platform extending axially while at least a rib extends radially so that the rib may be connected to mounting means on the casing therefrom, wherein an annular gap has an axial component formed between the shroud and the mounting means of the casing, the annular gap having opposed radially spaced walls formed on the shroud and the mounting means and whereby the ring seal has a "C" portion with a leg of the "C" portion extending axially so that the "C" portion has a greater radial dimension than that of the axial leg and the "C" portion is located in the radial component of the gap and has a radial dimension less than the radial dimension of the gap, and the leg of the ring seal includes a wave pattern with alternating peaks and the peaks being in contact with the opposed radially spaced walls of the annular gap to provide a gas seal at the joint between the shroud and the mounting means in order to prevent leakage of the cooling gas flow, and the wave pattern subtending an angle sufficient to allow the seal to be readily compressed radially.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
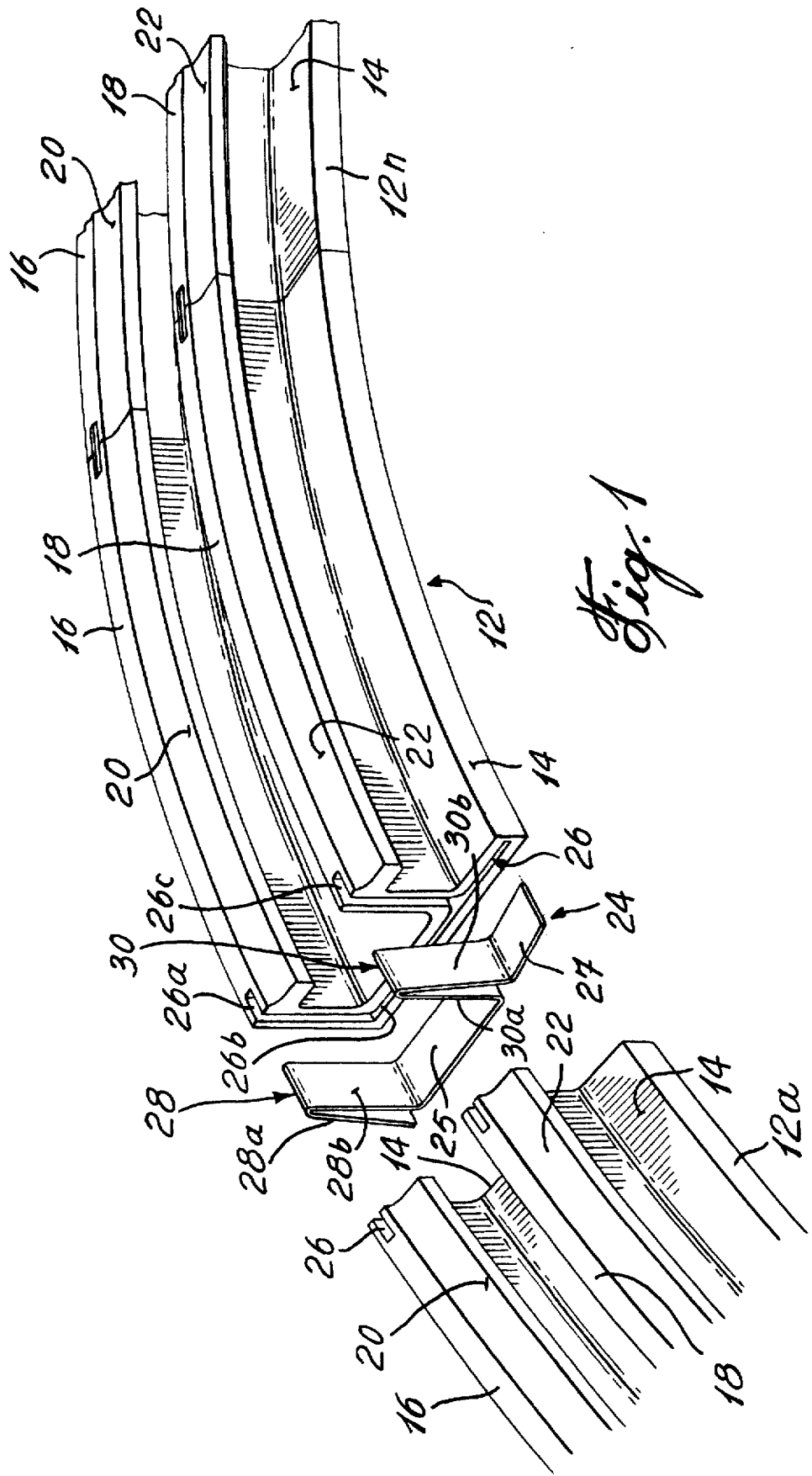
FIG. 1 is a fragmentary perspective view, partly exploded, showing an embodiment of one aspect of the present invention.
Figure 2:
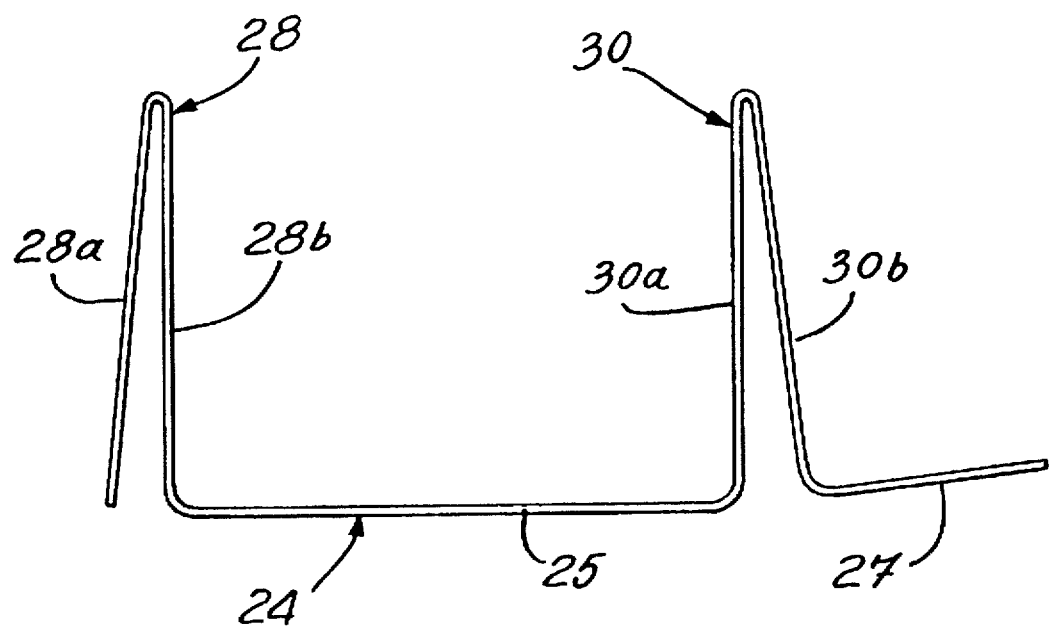
FIG. 2 is a front elevation of a detail shown in FIG. 1.
Figure 4:
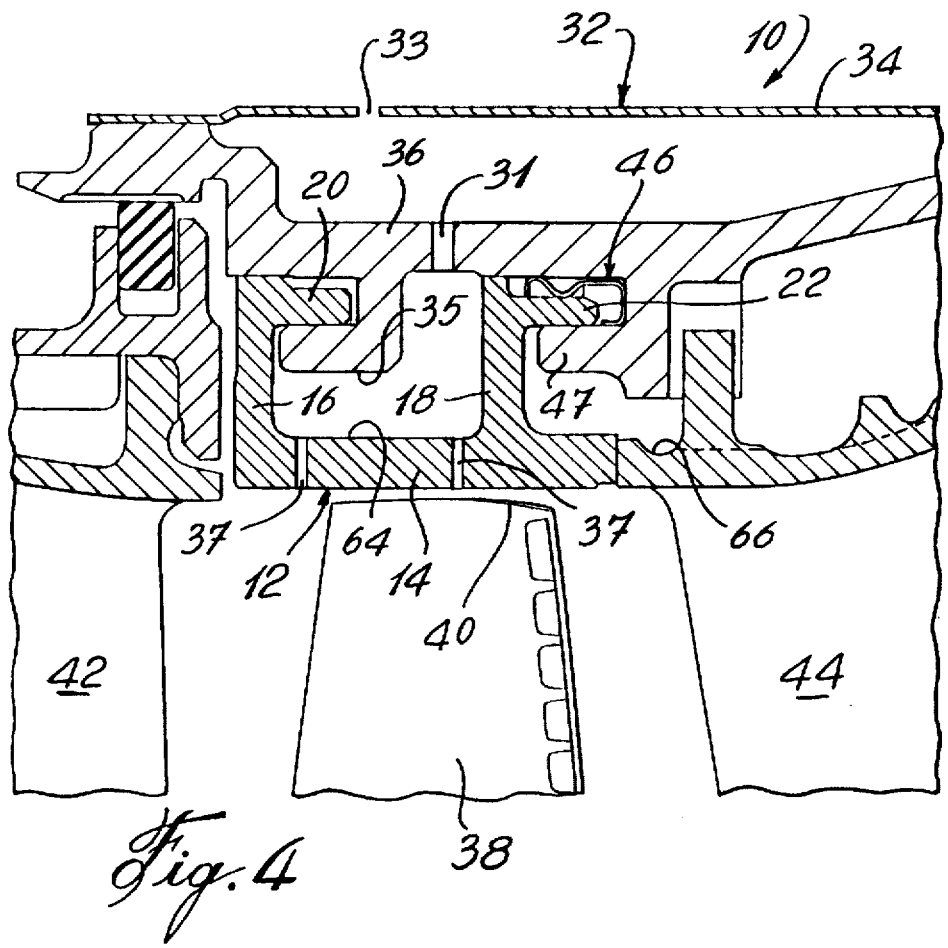
FIG. 4 is an axial cross-section of the turbine section of a gas turbine engine showing a detail of the present invention.

Referring now to the drawings and in particular FIGS. 1 and 2, there is shown a typical turbine blade shroud 12 for use in an engine 10. The shroud 12 includes a plurality of segments 12a . . . 12n arranged circumferentially and concentric with the rotor on which turbine blades 38 are mounted (FIGS. 1 and 4).

A shroud segment, as represented by the numeral 12 in FIG. 1, includes a platform 14 made up essentially of an annular flat plate-like member having an axial component and a pair of upstanding ribs 16 and 18 having flanges 20 and 22 respectively. The ribs 16 and 18 and respective flanges 20 and 22 act to support the shroud platform 14 as well as to define the cooling air passages and chambers. The flanges 20 and 22, as shown in FIG. 4, also serve to mount the shroud within the engine casing 32 and mounting structure 36 as will be described further. The wall 34 of engine casing 32 may be provided with a vent opening 33 to allow cool air to enter the space between the support structure and the casing 32. Ventilation openings 31 are also provided in the support structure 36 to allow this cool air to enter annular channel 35 formed between the shroud 12 and support structure 36. Finally, apertures 37 in the shroud 12 allow this cooling air to exhaust into the hot gas path.

In order to provide an inter-segment seal, the end walls of each shroud segment 12 are provided with a continuous groove 26 which includes an axial component 26b and radial components 26a and 26c which correspond with the ribs 16 and 18 respectively. The seal 24 is made up of a sheet 24 of heat resistant alloy which has been bent to provide upstanding elements 28 and 30 and horizontal members 25 and 27 which correspond with the platform 14. The seal could, of course, be extruded or molded from any suitable heat resistant material.

Each of the upstanding elements 28 and 30 includes legs 28a and 28b and 38a and 38b which are slightly divergent and wider than the respective groove, as shown in FIG. 2. This configuration provides a degree of resilience to the upstanding elements 28 and 30 such that when the seal 24 is fitted into the groove 26 at the end of the shroud 12, the upstanding elements 28 and 30 must each be squeezed in order to be inserted into the upstanding groove segments 26a and 26c, thereby allowing a tight fit of the seal in the groove 26. In view of the resilience thereof, the segments can be easily assembled and then separated and the seal 24 replaced in the event of necessary maintenance.

Figure 3:
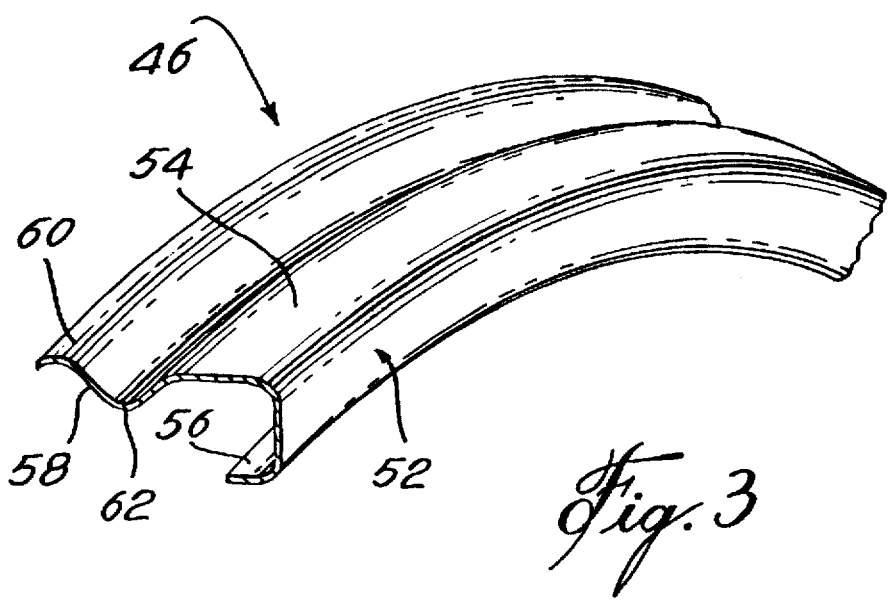
FIG. 3 is a perspective view, partly in cross-section, of an embodiment of another aspect of the present invention.
Figure 5:
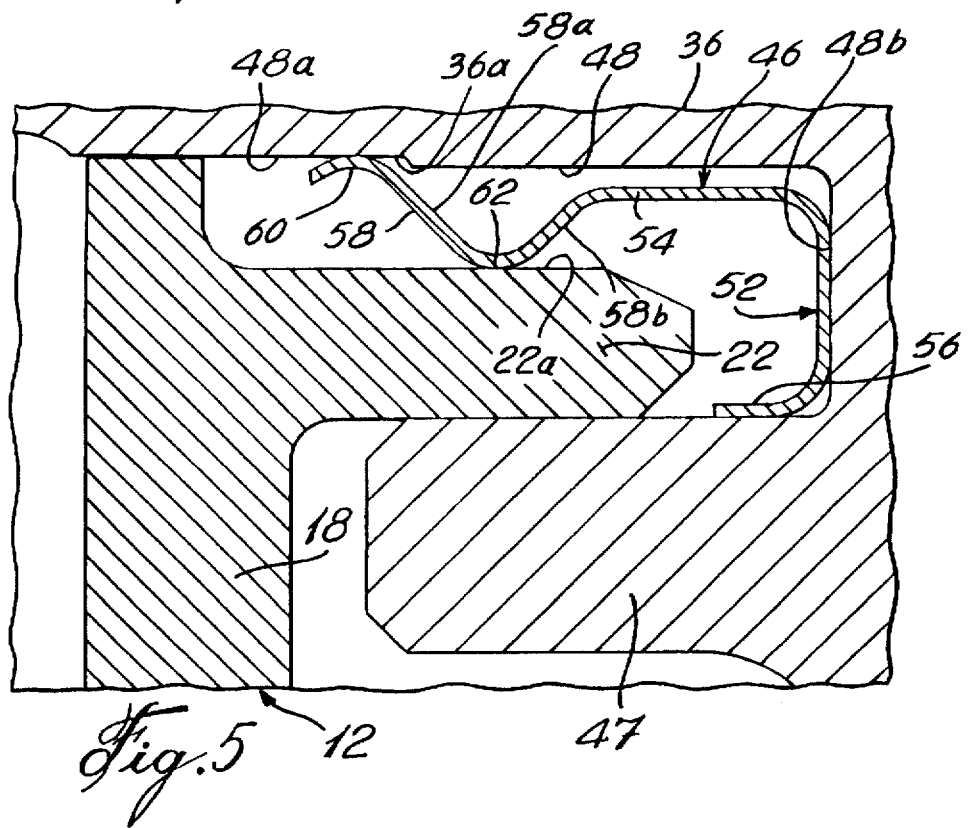
FIG. 5 is an enlarged fragmentary cross-sectional view taken in the same plane as FIG. 4 and showing a detail of FIG. 4.

Another aspect of the present invention is shown in FIGS. 3 to 5. The turbine section of engine 10 is partly illustrated in FIG. 4 and, in addition to the turbine blades 38, stator vanes 42 and 44 are shown. Each stator vane has a shroud structure mounted thereto, while the shroud 12 surrounds the blade tips 40 of turbine blades 38.

As shown herein, the mounting structure 36 within the engine casing 32 supports the shroud 12, as illustrated in FIGS. 4 and 5. The flange 22 of the shroud 12 may be supported on the flange 47 of the support structure 36, for instance. In the same manner, flange 20 may be supported the by the flange of support structure 36. The ribs 16 and 18 as well as the configuration of the support structure 36 allows for cooling channels to be formed in and around the shrouds. The air pressure in cooling channel 64, may be different from that around channel 66, and thus these different channels or chambers must be sealed.

A ring seal 46 is provided in the gap or annular recess 48 formed by the groove formed by flange 47. In this case, the recess 48, when flange 22 is inserted, has an "L" shape with an axial component 48a and a radial component 48b. The ring seal 46 includes a "C" shaped portion 52 which has a smaller radial dimension than the recess 48 in the area of the radial component 48b. "C" shaped portion 52 includes legs 54 and 56. An extension of leg 54 has a wave pattern subtending flat angles to provide wave section 58 having peaks 60 and 62. The angle subtended by arms 58a and 58b is an obtuse angle. The angle may be acute, but it must be great enough that the seal is readily compressible radially.

The configuration of wave section 58 is such that the radial extent between the peaks 60 and 62 is slightly greater than the radial dimension between walls 36a and 22a of the recess 48. Ring seal 46 is made from a heat resistant material or alloy having an inherent elasticity suitable to maintain spring fitted continual contact with opposed walls 22a and 36a. Thus, the wave section 58 is spring fitted into the recess 48 so that the peaks 60 and 62 are in continual contact with the opposed walls 22a and 36a.

Thus, because of the configuration of the ring seal 46, the ring seal can easily be fitted into the recess 48 before the shroud flange 22 is inserted therein during the assembly thereof. Ring seal 46 may constructed as an endless ring to be fitted into recess 48. The ring seal 46 may be fabricated from a sheet of resilient heat resistant alloy bent to form the herein described configuration.

The flange 22 may be beveled, as shown, in order to enable its insertion against the spring seal 46 already in the recess 48. The radial resilience of the wave portion 58 will allow easy insertion of the flange 22 as well as easy replacement of the ring seal 46 when the shroud is removed from the recess 48 during maintenance thereof.

Therefore, both seal 24 and ring seal 46 can cooperate with shroud 12 for easy assembly of the seals and the shroud segments allowing for greatly facilitated maintenance of the shroud 12.

We claim:

1. A seal for a gas turbine engine to seal a joint between two annular engine parts, the joint between the two parts comprising an annular gap with an axial component and a radial component, each component including radially spaced-apart walls, wherein the seal includes a "C" portion having a radial extent less than the spaced-apart walls of the radial component to fit within the radial component of the annular gap, with a leg of the "C" extending axially within the axial component of the annular gap, the leg having a wavy construction with one peak of the wavy portion in contact with one of the spaced-apart walls of the axial component of the annular gap and another peak in contact with the other of the spaced-apart walls of the axial component of the annular gap, whereby the gap is sealed against leakage by gases flowing on either side of the joint.

2. The seal for a gas turbine engine as defined in claim 1, wherein the seal is an endless ring.

3. A ring seal for a turbine blade tip shroud for a gas turbine engine having a hot gas path and an outer casing, wherein the shroud is located between the hot gas path and a cooling gas conduit formed between the shroud and the outer casing, the shroud including an axially extending platform for engaging a mounting structure within the engine casing to form an annular gap having an axial and a radial component between the shroud and the mounting structure, the annular gap having opposed radially spaced walls formed on the shroud and the mounting structure, the ring seal comprising a "C" portion having a greater radial dimension than that of the axially extending platform and less than the radial dimension of the gap, the "C" portion for location in the radial component of the annular gap with the "C" portion of the ring seal having a leg extending axially within the annular component of the gap, the leg including a wavy pattern with alternating peaks for contact with the opposed radially spaced walls of the annular gap to provide a gas seal at the joint between the shroud and the mounting structure.

4. The ring seal as defined in claim 3, wherein the ring seal is made from a bent sheet of inherently elastic, heat resistant alloy.

* * * * *